US005738910A

United States Patent [19]

Yamasaki

[11] Patent Number: 5,738,910

[45] Date of Patent: Apr. 14, 1998

[54] PRINTING PROCESS FOR ENABLING REPEATED USE OF PRINTING PAPER

[76] Inventor: Tomoki Yamasaki, 5-1 Higashihangi-cho, Shimogamo, Sakyo-ku, Kyoto-shi, Kyoto 606, Japan

[21] Appl. No.: 754,528

[22] Filed: Nov. 21, 1996

[51] Int. Cl.[6] ............................... B05D 5/04; C09D 11/02

[52] U.S. Cl. ........................ 427/288; 427/421; 106/20 R; 106/21 R; 106/21 A; 106/20 A; 106/19 A; 106/22 B

[58] Field of Search .................................... 427/421, 288; 106/20 R, 21 R, 21 A, 20 A, 19 A, 22 B

[56] References Cited

U.S. PATENT DOCUMENTS 4,171,982 10/1979 Lin ........................................... 106/21

*Primary Examiner*—Shrive Beck

*Assistant Examiner*—Bret Chen

*Attorney, Agent, or Firm*—Birch, Stewart, Kolasch & Birch, LLP

[57] ABSTRACT

A printing process for enabling repeated use of printing paper by printing with ink of diluted iodine tincture solution on the printing paper with starch component exposed on the surface, or by printing letters with paste contained iodine starch and applying diluted sodium thiosulfate (hypo) liquid to the printed surface of the printed matter printed with iodine starch to allow the printing to disappear when the printed matter is reused.

11 Claims, No Drawings

PRINTING PROCESS FOR ENABLING REPEATED USE OF PRINTING PAPER

BACKGROUND OF THE INVENTION

1. Field of the Invention

The present invention relates to a printing process for enabling repeated use of printing paper.

2. Description of Background Art

Since a revolution in the office place has made it easy to copy documents, an age of consuming a large volume of paper has arrived.

Presently, the most popularly used copying process is the one in which a fusible resin powder toner containing pigments is applied utilizing static electricity.

Printing with a toner is convenient but, in turn, has drawbacks in that it consumes a large volume of paper, has a difficulty in recycling printing paper once a toner is used utilizes a tremendous amount of wood resources of the earth, increases wastes, and causes environmental problems.

SUMMARY OF THE INVENTION

In view of the foregoing, it is an object of the present invention to easily recycle paper when the paper once printed is no longer used.

To achieve this objective, a thin coat of starch is applied to the paper surface or the starch component used for paste at the time of papermaking is utilized.

In the meantime, for the ink, iodine tincture containing traces of iodine is used by diluting it with water or organic solvents such as alcohol.

Any of letterpress printing, offset printing, or ink jet system may be used.

The present printing process is to print letters with the ink of diluted iodine tincture solution on printing paper with the starch component exposed on the surface and print letters with iodine starch, and when the printed matter printed as above is recycled, a diluted sodium thiosulfate (hypo) liquid is applied on the surface of the printed matter printed with the iodine starch, thereby allowing printing to disappear and enabling repeated use of the printing paper.

The present invention uses printing paper applied with reinforcing liquid to the paper surface with a mixture of water-soluble plastics, starch paste, pigments, etc. for reinforcing paper quality when paper grows weak.

DETAILED DESCRIPTION OF PREFERRED EMBODIMENTS

Now this invention is described referring to an injection system.

A diluted iodine tincture solution is contained in an ink cartridge inside the ink jet printer, and using a computer, printing begins and printing of "B-4" writing paper size finishes in about 1 minute.

During printing, the iodine tincture reacts with the starch component and is exposed as dark brown letters, and printing finishes.

The chemical reaction of this printing process takes place as follows.

Iodine tincture is obtained by dissolving KI (potassium iodate) in the aqueous alcohol solution and is ionized into $$K \leftrightharpoons K^{+} + I^{-}.$$

When this is oxidized, $$2I^{-} + 2(+) \rightarrow I_2.$$

$I_2$ changes to dark brown when reacting with starch.

This printed matter is able to endure the use over a long time as it is.

If the printed paper is recycled using ink of iodine tincture, diluted sodium thiosulfate (hypo) solution is passed through or sprayed over a water-absorbent roller made of felt, or rubber/sponge or the roller is immersed in the solution to allow the solution to adhere to the printed matter. Sodium thiosulfate easily reduces dark brown iodine starch substance and is able to erase printing by making it colorless and transparent.

Chemical reactions of the printing disappearing process in which dark brown printing are made colorless are shown as follows.

$I_2$ (iodine) reacts with $Na_2S_2O_3$ (sodium thiosulfate) into NaI (sodium iodide) and $NaS_4O_6$ (sodium dithiosulfate).

$$\frac{1}{2} I_2 + 2Na_2S_2O_3 \rightarrow NaI + NaS_4O_6$$

Now, both NaI and $NaS_4O_6$ are colorless and transparent and the printed matter has the printing erased and is made colorless.

After decomposing hypo by washing it with water or applying or immersing it with a liquid containing diluted oxidizing agent (for example, hydrogen peroxide solution) or other methods, the paper is dried naturally or by a heater for reuse. This method enables one sheet of paper to be reused hundreds of times.

On the other hand, when paper becomes weak after repeated reuse or the paper is originally weak, a reinforcing liquid made by mixing water-soluble plastics, starch-based paste, white pigment, etc. is applied to the paper surface; then, the paper can be used further hundreds of times. The excess hypo is decomposed by the following chemical formula.

$$Na_2S_2O_3 + H_2O + 2O_2 \rightarrow 2NaHSO_4$$

Because this invention is a printing process for enabling a repeated use of printing paper by printing letters with ink of diluted iodine tincture solution on a printing paper with starch component exposed on the surface, or by printing letters with paste contained iodine starch and applying a diluted hypo liquid on the paper surface printed with iodine starch when the printed matter is reused to cause the printing to disappear, the invention can easily achieve recycling of the printing paper, can save printing paper, can effectively use wood resources, and can reduce wastes, all of which are desirable from the viewpoint of environmental problems.

This invention enables the reuse of printing paper with the paper surface applied with a reinforcing liquid in which water-soluble plastics, starch-based paste, pigments, etc. are mixed, even when the paper becomes weak after repeated use or the paper is originally weak.

What is claimed is:

1. A printing process for enabling repeated use of paper comprising the following steps:

applying starch to a paper surface;

utilizing iodine tincture containing traces of iodine for printing printed matter on the paper surface coated with said starch; and applying a solution of diluted sodium thiosulfate to the paper surface for removing the printed matter from the paper surface.

2. The printing process for enabling repeated use of paper according to claim 1, and further including the step of applying a mixture of water soluble plastic to the paper surface for reinforcing the paper.

3. The printing process for enabling repeated use of paper according to claim 1, and further including the step of applying a mixture of starch paste to the paper surface for reinforcing the paper.

4. The printing process for enabling repeated use of paper according to claim 1, and further including the step of applying a mixture of water soluble plastic, starch paste and pigments to the paper surface for reinforcing the paper.

5. The printing process for enabling repeated use of paper according to claim 1, wherein the iodine tincture is dissolved potassium iodate in an aqueous alcohol solution and is ionized into:

$$KI \leftrightarrows K^{4}+I^{-}.$$

6. The printing process for enabling repeated use of paper according to claim 5, wherein the iodine tinctures is oxidized into:

$$2I^{-}+2\,(+)\rightarrow I_{2}.$$

7. The printing process for enabling repeated use of paper according to claim 1, wherein the diluted sodium thiosulfate solution is sprayed over a water absorbent felt roller and applied to the paper surface to allow the solution to adhere to the paper.

8. The printing process for enabling repeated use of paper according to claim 1, wherein the diluted sodium thiosulfate solution is sprayed on a rubber sponge and applied to the paper surface to allow the solution to adhere to the paper.

9. The printing process for enabling repeated use of paper according to claim 1, wherein a roller is immersed in the diluted sodium thiosulfate solution and applied to the paper surface to allow the solution to adhere to the paper.

10. The printing process for enabling repeated use of paper according to claim 1, and further including the steps of washing the paper surface with a diluted oxidizing agent and drying the paper surface for reuse.

11. The printing process for enabling repeated use of paper according to claim 10, wherein the diluted oxidizing agent is a hydrogen peroxide solution.

* * * * *